US009747589B2

(12) United States Patent
Kurian (10) Patent No.: US 9,747,589 B2
(45) Date of Patent: *Aug. 29, 2017

(54) MOBILE ONE-TIME CARD NUMBER GENERATOR FOR ATM USAGE

(71) Applicant: BANK OF AMERICA CORPORATION, Charlotte, NC (US)

(72) Inventor: Manu Jacob Kurian, St. Louis, MO (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/047,106

(22) Filed: Feb. 18, 2016

(65) Prior Publication Data

US 2016/0162887 A1 Jun. 9, 2016

Related U.S. Application Data

(63) Continuation of application No. 14/339,344, filed on Jul. 23, 2014, now Pat. No. 9,292,849.

(51) Int. Cl.
| | |
|---|---|
| *G06Q 40/00* | (2012.01) |
| *G06F 17/00* | (2006.01) |
| *G06K 5/00* | (2006.01) |
| *G06Q 20/10* | (2012.01) |
| *G06Q 20/38* | (2012.01) |
| *G06Q 20/40* | (2012.01) |

(Continued)

(52) U.S. Cl.
CPC ..... *G06Q 20/1085* (2013.01); *G06Q 20/3223* (2013.01); *G06Q 20/3274* (2013.01); *G06Q 20/36* (2013.01); *G06Q 20/385* (2013.01); *G06Q 20/4014* (2013.01)

(58) Field of Classification Search
CPC ............ G06C 20/1085; G06C 20/3223; G06C 20/3274; G06C 20/26; G06C 20/20; G06C 20/385; G06C 20/4014
USPC ........................................ 235/379, 380, 381
See application file for complete search history.

(56) References Cited

U.S. PATENT DOCUMENTS

| | | |
|---|---|---|
| 6,163,771 A | 12/2000 | Walker et al. |
| 8,201,747 B2 | 6/2012 | Brown et al. |
| 2001/0034720 A1 | 10/2001 | Armes |

(Continued)

OTHER PUBLICATIONS

M. Haahr, "Introduction to Randomness and Random Numbers" Internet Archive, Jul. 22, 2008, (https://web.archive.org/web/20080722193755/https://www.random.org/randomness/).

(Continued)

*Primary Examiner* — Laura Gudorf
(74) *Attorney, Agent, or Firm* — Michael A. Springs; Moore & Van Allen PLLC; W. Kevin Ransom (57) ABSTRACT

Embodiments are directed to a mobile bank card number generator for digital wallet. Embodiments receive a request from a user to perform an ATM transaction on an account owned by the user; in response to the request to perform an ATM transaction, generate a one-time bank card number associated with the account owned by the user; generate a readable indicia based at least in part on the one-time bank card number; and initiate communication of the readable indicia to an ATM, wherein the ATM receives a user authentication credential from the user, a bank system validates the user authentication credential and in response to validating the user authentication credential, approves the ATM transaction for the user's account.

20 Claims, 6 Drawing Sheets

(51) Int. Cl.
*G06Q 20/32* (2012.01)
*G06Q 20/36* (2012.01)

(56) References Cited

U.S. PATENT DOCUMENTS

| | | |
|---|---|---|
| 2002/0133467 A1 | 9/2002 | Hobson et al. |
| 2003/0028481 A1 | 2/2003 | Flitcroft et al. |
| 2004/0168067 A1 | 8/2004 | Russikoff |
| 2007/0114274 A1 | 5/2007 | Gibbs et al. |
| 2008/0014917 A1 | 1/2008 | Rhoads et al. |
| 2009/0276347 A1 | 11/2009 | Kargman |
| 2010/0114731 A1 | 5/2010 | Kingston et al. |
| 2011/0016047 A1 | 1/2011 | Wu et al. |
| 2011/0099113 A1 | 4/2011 | Al-Herz et al. |
| 2012/0173311 A1 | 7/2012 | Chang et al. |
| 2013/0117185 A1 | 5/2013 | Collison et al. |
| 2013/0159186 A1 | 6/2013 | Brudnicki et al. |
| 2015/0058214 A1 | 2/2015 | Cohen |
| 2015/1868721 | 7/2015 | Sobol et al. |

OTHER PUBLICATIONS

Wikipedia: Controlled Payment Number; https://en.wikipedia.org/wiki/Controlled_payment_number, May 24, 2017.

MOBILE ONE-TIME CARD NUMBER GENERATOR FOR ATM USAGE

CROSS-REFERENCE TO RELATED APPLICATIONS

This application is a continuation of U.S. patent application Ser. No. 14/339,344, filed Jul. 23, 2014; the contents of which are hereby incorporated by reference.

BACKGROUND

In the new technological age, the security of personal information, or the lack thereof, has become an issue that concerns many people. As a result, several business industries, such as financial institutions, have taken precautionary measures to ensure the safety and protection of their customers' information. There is a need for a system to generate a bank card number capable accessing an associated financial institution account for ATM usage.

BRIEF SUMMARY

Embodiments of the invention are directed to an apparatus for a mobile bank card number generator for ATM usage. Embodiments of the present invention include a mobile device for generating a one-time bank card number for ATM usage, the apparatus comprising a memory; a processor; and a module stored in the memory, when executed by the processor, causes the processor to receive a request from a user to perform an ATM transaction on an account owned by the user; in response to the request to perform an ATM transaction, generate a one-time bank card number associated with the account owned by the user; generate a readable indicia based at least in part on the one-time bank card number; and initiate communication of the readable indicia to an ATM, wherein the ATM receives a user authentication credential from the user, a bank system validates the user authentication credential and in response to validating the user authentication credential, approves the ATM transaction for the user's account.

In some embodiments, the module when executed further causes the processor to receive a card limit from the user, wherein the card limit indicates a threshold transaction amount limiting usage of a bank card for use in an ATM transaction; and wherein generating the one-time bank card number is based at least in part on the received card limit; and wherein the readable indicia indicates to an ATM receiving the readable indicia the user the card limit.

In some embodiments, the readable indicia indirectly indicates to the ATM the card limit by providing a pointer that points to a data location at which the ATM may retrieve the card limit.

In some embodiments, the one-time bank card number directly indicates to the ATM the card limit, and wherein the ATM is configured to receive the communication initiated by the mobile device digital wallet and determine the card limit based on the one-time bank card number.

In some embodiments, initiating communication of the readable indicia comprises initiating display of the readable indicia on a display of the mobile device.

In some embodiments, the module is part of a digital wallet application running on the mobile device, wherein the digital wallet application is configured to store a plurality of one-time bank card numbers and/or readable indicia.

In some embodiments, the module uses a card generation algorithm to generate the one-time bank card number; and wherein a corresponding card interpretation algorithm is configured to be used to determine whether a one-time bank card number is valid.

In some embodiments, the card interpretation algorithm is further configured to determine a card limit associated with a one-time bank card number.

In some embodiments, the ATM uses the card interpretation algorithm to determine whether a received one-time bank card number is valid.

In some embodiments, the ATM receives the one-time bank card number from the mobile device and communicates it to a financial institution system that uses the card interpretation algorithm to determine whether the one-time bank card number is valid.

In some embodiments, initiating communication comprises initiating communication the ATM conducting the transaction with the user; and wherein the module when executed further causes the processor to receive, from the ATM, confirmation of approval of the transaction.

In some embodiments, the module when executed further causes the processor to initiate communication of a stored authentication credential from the mobile device to the ATM, wherein the ATM compares the stored authentication credential with the user authentication credential, and in response to determining a match, approves the ATM transaction for the user's account.

In some embodiments, the stored authentication credential is communicated from the mobile device to the ATM by the readable indicia.

In some embodiments, the module when executed further causes the processor to initiate communication of instructions for the ATM to retrieve the stored authentication credential from a financial institution system.

In some embodiments, the ATM, in response to receiving the readable indicia from the mobile device, retrieves the stored authentication credential from a financial institution system.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The embodiments presented herein are directed to systems, methods, apparatuses, and computer program products for a mobile bank card number generator to avoid potential exposure of a payment credential associated with the digital wallet. In this way, the user may continue to execute transactions with the merchant in a secure manner without the need for additional infrastructure.

A digital wallet refers to an electronic device that allows an individual to make e-commerce transactions. This may include purchasing items on-line with a computer or using a mobile device to purchase a product or service from a merchant. Typically, a digital wallet includes both a software and information component. The software component provides security and encryption for the personal information and for the actual transaction. A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer). In one aspect, the system may be a software application designed to run on a mobile device (e.g., a smartphone, cellular phone, personal digital assistant (PDA)) associated with the user in association with the stored digital mobile wallet. In another aspect, the system may include an interpretation algorithm designed to run on the point-of-sale device associated with the merchant designed to execute transactions using the generated bank card number.

In accordance with embodiments of the invention, the phrase "bank card number" may be defined as a temporary 16 digit card number similar in format to a credit card or a debit card number capable of being used as a payment vehicle. In one aspect, the bank card number may be used in place of a typical payment vehicle such as a credit card or a debit card. For purposes of the invention, the system is configured to generate a particular bank card number only once, i.e., no two bank card numbers are the same. In one aspect, the bank card numbers may be generated as a sequence of numbers. In another aspect, the bank card numbers may be generated using a pseudo random number generator algorithm.

In some embodiments, the mobile device may require verification of one or more authentication credentials of the user prior to initiating the mobile application. In one aspect, the one or more authentication credentials may include a password, a pass phrase, a personal identification number (PIN), a wrist band, an identification card, a security token, or a biometric identification such as a fingerprint, a retinal pattern, a facial recognition, a voice recognition, or the like.

Figure 1:
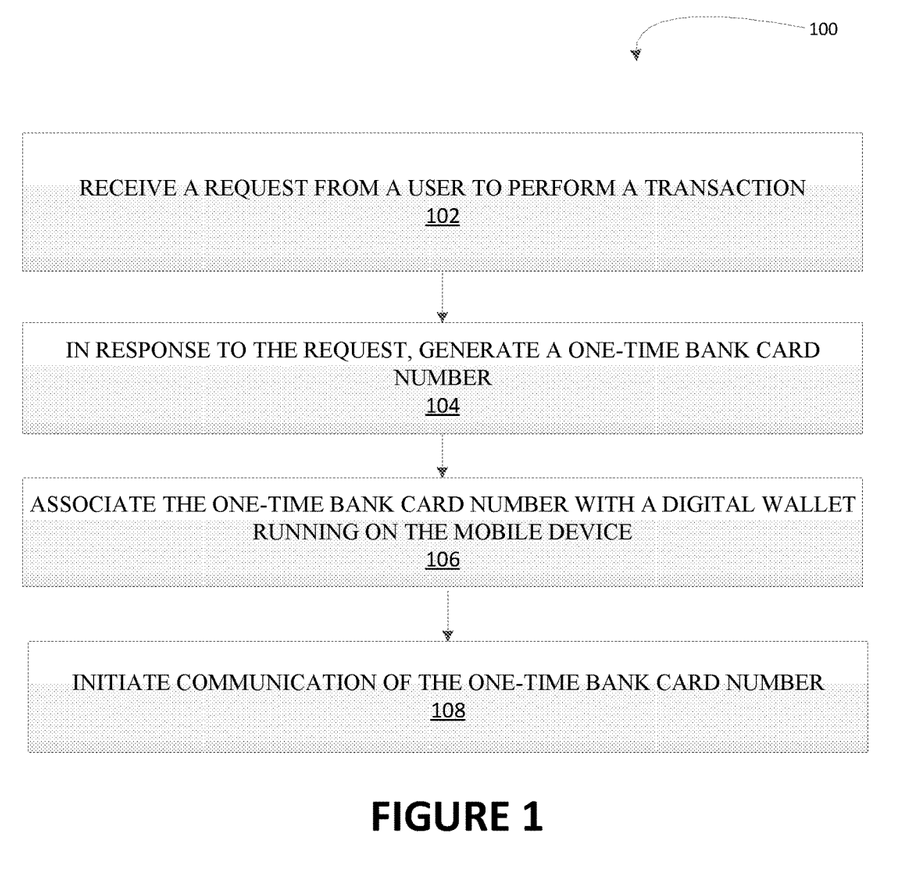
FIG. 1 illustrates a high level process flow for mobile bank card number generator for digital wallet in accordance with an embodiment of the invention.

FIG. 1 illustrates a high level process flow for mobile bank card number generator for digital wallet 100. As shown in block 102, the process flow includes receiving a request from a user to perform a transaction. In response to receiving the request, the process flow includes generating a bank card number, as shown in block 104. In this regard, the system may be configured to generate the bank card number and initiate the display of the bank card number or a representation of the bank card number on a display of the mobile device associated with the user. In response to generating a bank card number, the process flow includes associating the bank card number with a digital wallet running on the mobile device, as shown in block 106. In response to associating the bank card number with the digital wallet, the process flow includes initiating communication of the bank card number, as shown in block 108.

In one aspect, the system may receive the request from the user at a merchant location prior to the execution of the transaction at a point-of-sale terminal. In another aspect, the system may receive the request from the merchant at a merchant location prior to the execution of the transaction at a point-of-sale terminal. In some embodiments, the request may be received by the system from a user prior to the execution of an e-commerce transaction. In an example embodiment, the system may be configured to initiate presentation of a user interface to enable the user to transmit a request to perform a transaction.

In some embodiments, the system may be configured to transmit the request received from the user to a back-end database system associated with the financial institution. Typically, a back-end database is accessed by users indirectly through an external application rather than by application programming stored within the database itself or by low level manipulation of the data. A back-end database stores data but does not include end-user application elements such as stored queries, forms, macros, or reports. In response to transmitting the received request, the back-end database system may be configured to generate and/or retrieve a bank card number. In one aspect, the back-end database system may include one or more bank card numbers associated with a financial institution account. In another aspect, the back-end system may include one or more applications capable of generating a bank card number based on a received request. In response to generating and/or retrieving a bank card number, the back-end system may transmit the generated bank card number back to user. In one aspect, the generated bank card number may be transmitted to the user via a text message, an email, or a pop up message. In another aspect, the generated bank card number transmitted back to the user application to enable the user to access bank card number on the mobile device. In response, the user may present the bank card number to the merchant to complete the transaction.

In some embodiments, the bank card number may be used to execute a one-time transaction. For example, the generated bank card number is valid for a single transaction. In another embodiment, the generated bank card number may be generated to be used within a predefined time window. For example, the generated bank card number may be generated to be used within thirty seconds of generation of the number, after which the validity of the generated bank card number expires. In some other embodiments, the generated bank card number may be valid in specific geographical locations. In yet another embodiment, the generated bank card number may be used to execute transaction involving specific merchants, specific products and/or services, or the like. In some embodiments, the system may be configured to enable an interpretation algorithm stored at a merchant device to determine whether the card number is valid.

In some embodiments, the system may be configured to store a plurality of pre-generated bank card numbers in the mobile device associated with the user. In this regard, the system may be configured to retrieve a pre-generated bank card number to enable the user to execute the transaction with the merchant. In one aspect, the pre-generated bank card numbers may already be authenticated by the financial institution prior to the user execution of the transaction with the merchant.

In some embodiments, the mobile device associated with the user may include a pseudo random number generator algorithm configured to generate bank card numbers based on a received request. Typically, a pseudo random number generator is an algorithm for generating a sequence of numbers whose properties approximate the properties of sequences of random numbers. In one aspect, the pseudo random number generator algorithm may use a predetermined mathematical formulae or simply pre-calculated tables to produce sequences of numbers that appear random. In one aspect, the bank-end system may include a pseudo random number generator algorithm substantially similar to the pseudo random number generator algorithm on the mobile device associated with the user. In this regard, the system may be configured to match the bank card number generated using the pseudo random number generator algorithm on the mobile device associated with the user and the bank card number generated using the pseudo random number generator algorithm at the back-end database system to validate the transaction.

For example, the user may execute the transaction at a point-of-sale of the merchant using the bank card number generated using the pseudo random number generator algorithm in the mobile device. The merchant may initiate the transaction and transmit the transaction request to the issuer of the payment vehicle. In one aspect, the transaction request may include the bank card number generated using the pseudo random number generator algorithm. In some embodiments, the transaction request may also include merchant information, transaction information, user information, or the like. In response to receiving the request, the issuer may generate a bank card number using the pseudo random number generator algorithm at the back-end database system. The issuer may then compare the bank card number generated using the pseudo random number generator algorithm on the mobile device associated with the user and the bank card number generated using the pseudo random number generator algorithm at the bank-end database system to determine a match. If the numbers match, the issuer may initiate the transfer of payment from the financial institution account associated with the user to the merchant.

In some embodiments, the system may be configured to initiate the transfer of payment based on at least the location information associated with the user and the merchant. In one aspect, the matching location information associated with the user and the merchant may be used in addition to matching the bank card number generated using the pseudo random number generator algorithm. For example, when the merchant transmits a transaction request to the issuer, the system may be configured to determine the merchant location from the transaction request and the user's location based on a position system associated with the mobile device of the user. In response, the system may determine that the user is currently at or substantially close to the merchant location. In this regard, the system may be configured to first determine a match between the bank card numbers generated by the mobile device of the user and the back-end database system and then determine whether the user is currently located substantially close to the merchant location. In response to a successful match, the issuer may initiate transfer of payment from the financial institution account associated with the user to the merchant.

In some embodiments, the generated bank card number may include an expense limit. In this regard, the system may be configured to receive a card limit from the user, wherein the card limit indicates a threshold spending amount limiting usage of the bank card. In one aspect, generating the bank card number may be based on at least the received card limit. In this regard, the generated bank card number may indicate to the merchant conducting the transaction with the user that the bank card number has a predetermined expense limit. In one aspect, the bank card number may indirectly indicate to the merchant the card limit by providing a pointer that points to a data location at which the merchant may retrieve the card limit. In another aspect, the bank card number may indirectly indicate to the merchant the card limit, wherein the merchant may receive the communication initiated by the mobile device of the user and determine the card limit based on the bank card number.

In some embodiments, the user may use one or more payment vehicles to execute the transaction. In one aspect, the user may exhaust the expense limit on the generated bank card number first and then use another payment vehicle to complete the rest of the transaction. In some embodiments, the system may be configured to enable the user to generate one or more bank card numbers to complete a transaction with the merchant. For example, if the expense limit on the generated bank card number is $40, the user may generate two bank card numbers, each having an expense limit of $40 to execute a transaction for $80. In one aspect, the system may be configured to implement a limit on the number of times the user may generate a bank card number to execute a transaction with the same merchant.

In some embodiments, the generated bank card number may be transferable to an authorized individual associated with the user. In this regard, the system may be configured to enable the user to communicate the generated bank card number to a third person (e.g., a friend or a relative) for the third person to use the bank card number to execute a transaction. In one aspect, the bank card number may have limitations on the use of the bank card number such as limitations against unauthorized or unregistered devices. In some embodiments, the system may be configured to implement biometric and/or voice recognition based authentication software to enable the third person to access the bank card number. In one aspect, the system may enable the user to implement an expense limit on the bank card number transferred to the third person.

In some embodiments, the generated bank card number may be used to execute a transaction at the ATM. In this regard, the system may be configured to enable the user to communicate the bank card number available to the user on the mobile device to the ATM using readable indicia (e.g., barcode, Quick Response (QR) code, or the like). The system may then be configured to receive a personal identification number (PIN) from the user. The system may then compare the PIN entered by the user with the PIN stored in the financial institution database to determine a match. Based on a successful match, the system may be configured to initiate one or more available ATM transactions (e.g., cash withdrawals, check balances, mobile phone credit, or the like). For example, if the user loses his/her wallet while on vacation in another country, the user may be forced to cancel the debit/credit card associated with his/her financial institution account. In such situations, the user may utilize the present system to access his/her financial institution account and continue to execute transactions based on the generated bank card number without the need for a credit card.

Figure 2:
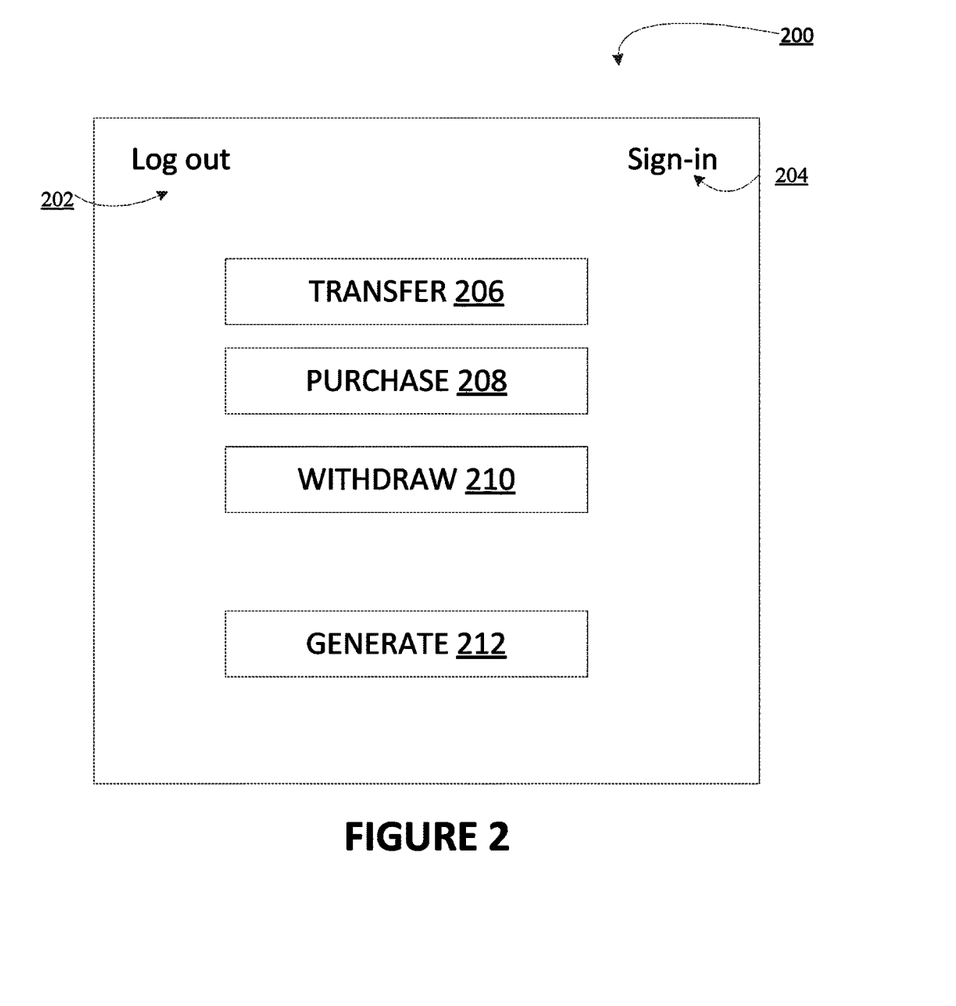
FIGS. 2-5 illustrate an exemplary user interface for generating a bank card number in accordance with an embodiment of the invention.

FIGS. 2-5 illustrate an exemplary user interface 200 for generating a bank card number. In some embodiments, the user interface 200 enables the user to securely log in to the application to generate the bank card number using the sign in option 204 and securely sign out using the log out option 202. As shown in FIG. 2, the user interface includes a transfer option 206, a purchase option 208, and/or a withdraw option 210. The transfer option 206 may enable the user to generate the bank card number and transfer the generated bank card number to an authorized third person. The purchase option 208 may enable the user to generate the bank card number to execute a transaction with a merchant. The withdraw option 210 may enable the user to generate the bank card number to execute one or more ATM transactions. In response to selecting the one or more options, the user may select the generate option 212 to generate the bank card number.

Figure 3:
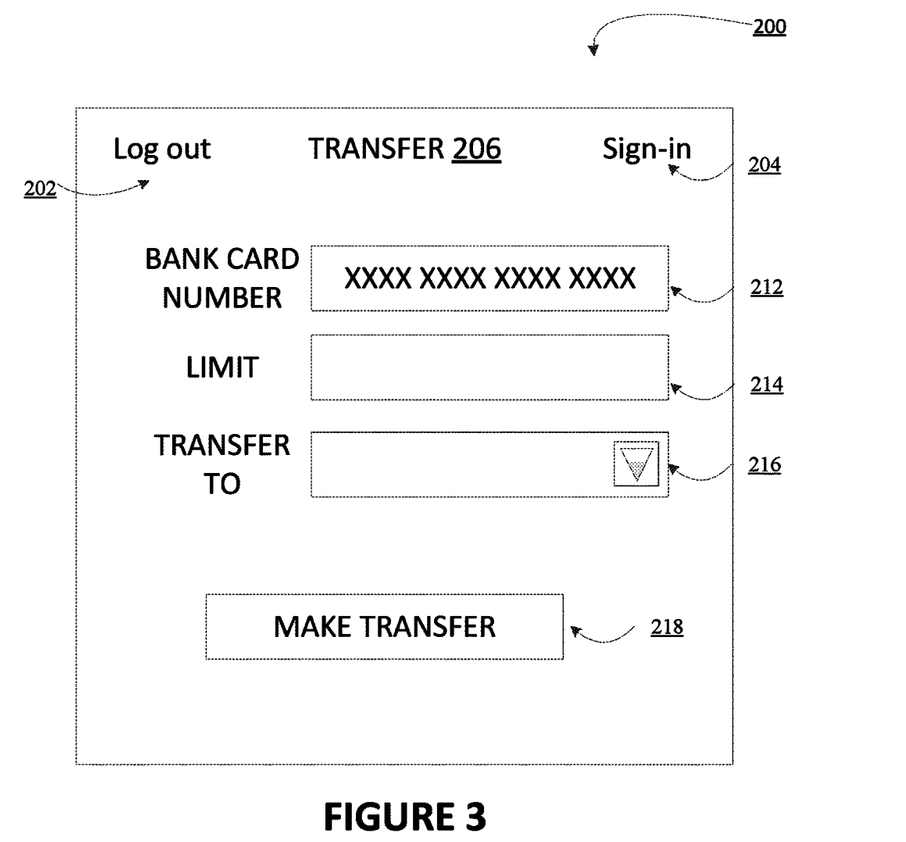

FIG. 3 illustrates a user interface if the user generates a bank card number based on a user selection of the transfer option 206. The user interface includes the generated bank card number 212, an expense limit 214, and a transfer to option 216. In some embodiments, the user may choose to implement a threshold limit on the generated bank card number. The user may choose to not implement a threshold limit on the generated bank card number by not entering a limit amount. In some embodiments, the user interface may include a drop-down list of authorized recipients from which the user may choose to transfer the generated bank card number. In one aspect, the user may add a recipient to the existing list of transfer recipients to transfer the generated bank card number.

Figure 4:
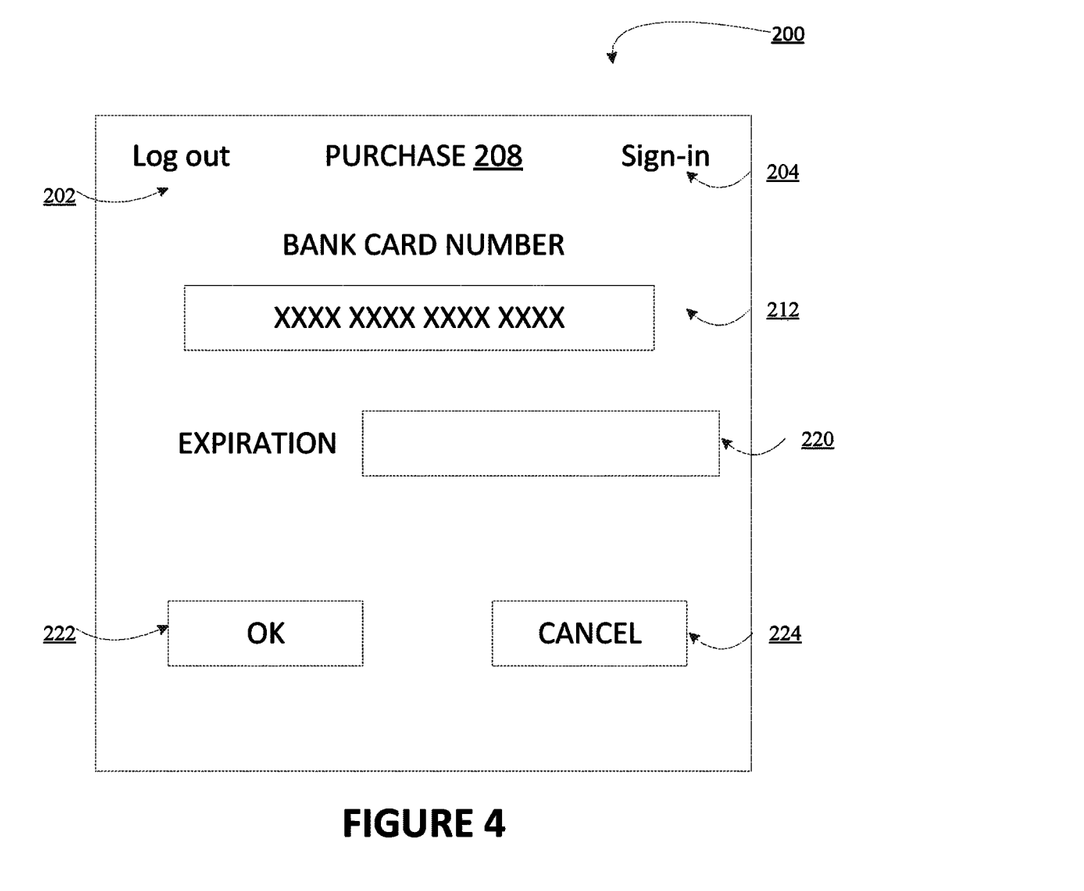

FIG. 4 illustrates a user interface if the user generates a bank card number based on a user selection of the purchase option 208. As shown, the user interface includes the generated bank card number 212 and an expiration date 220 associated with the generated bank card number. The user may present the generated bank card number to the merchant to execute the transaction. In one aspect, the user may select the ok option 222 to generate readable indicia associated with the generated bank card number capable of being scanned by the merchant system to complete the transaction.

In another aspect, the user may select the cancel option 224 to redo the process. In another aspect, the user may directly input the generated bank card number into the merchant system to execute the transaction.

Figure 5:
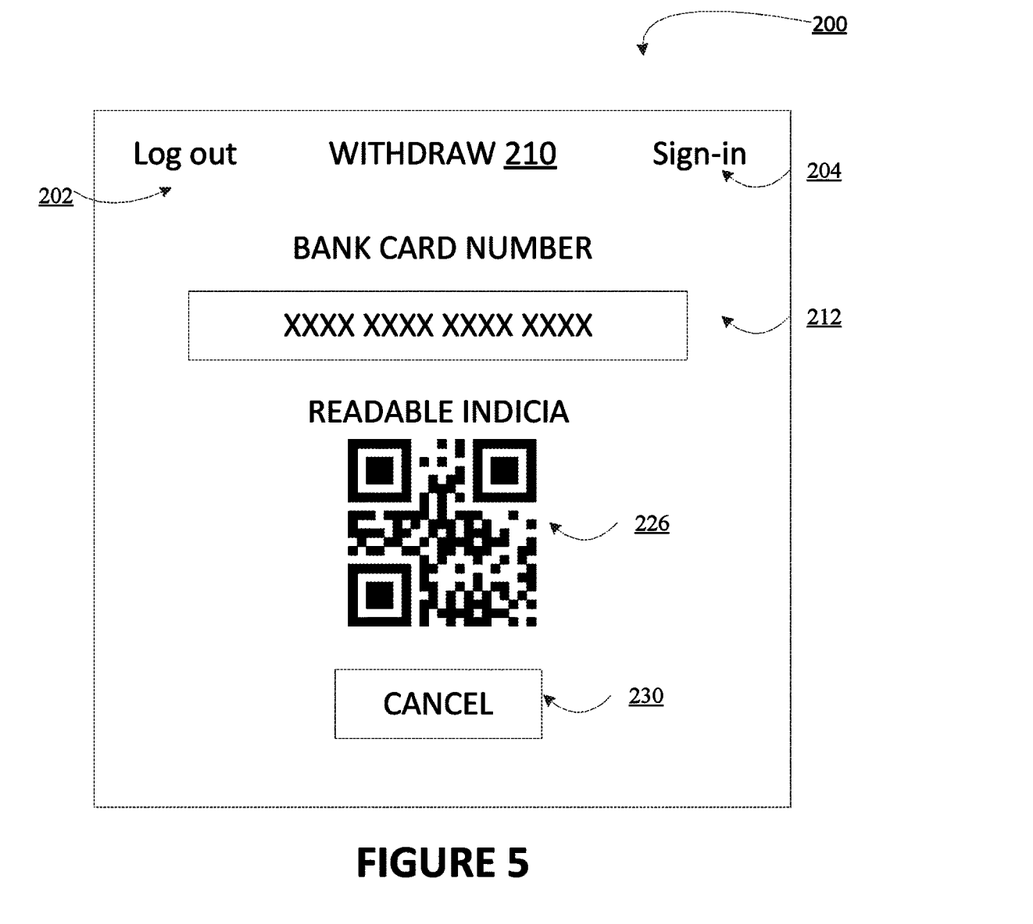

FIG. 5 illustrates a user interface if the user generates a bank card number based on a user selection of the withdrawal option 210. As shown, the user interface includes the generated bank card number 212 and associated readable indicia 226 capable of being scanned at an ATM. In one aspect, the user may select the cancel option 230 to redo the process.

Embodiments of the present invention may include provisions to incorporate ways and means to enable speech-to-text and text-to-speech capability. In this regard, a competent voice recognition module may be included in the system. Embodiments of the present invention may include provisions to incorporate ways and means to interact with the mobile application using text. In one aspect, the system may be configured to support multiple languages and enable the user to switch from one language to another.

Figure 6:
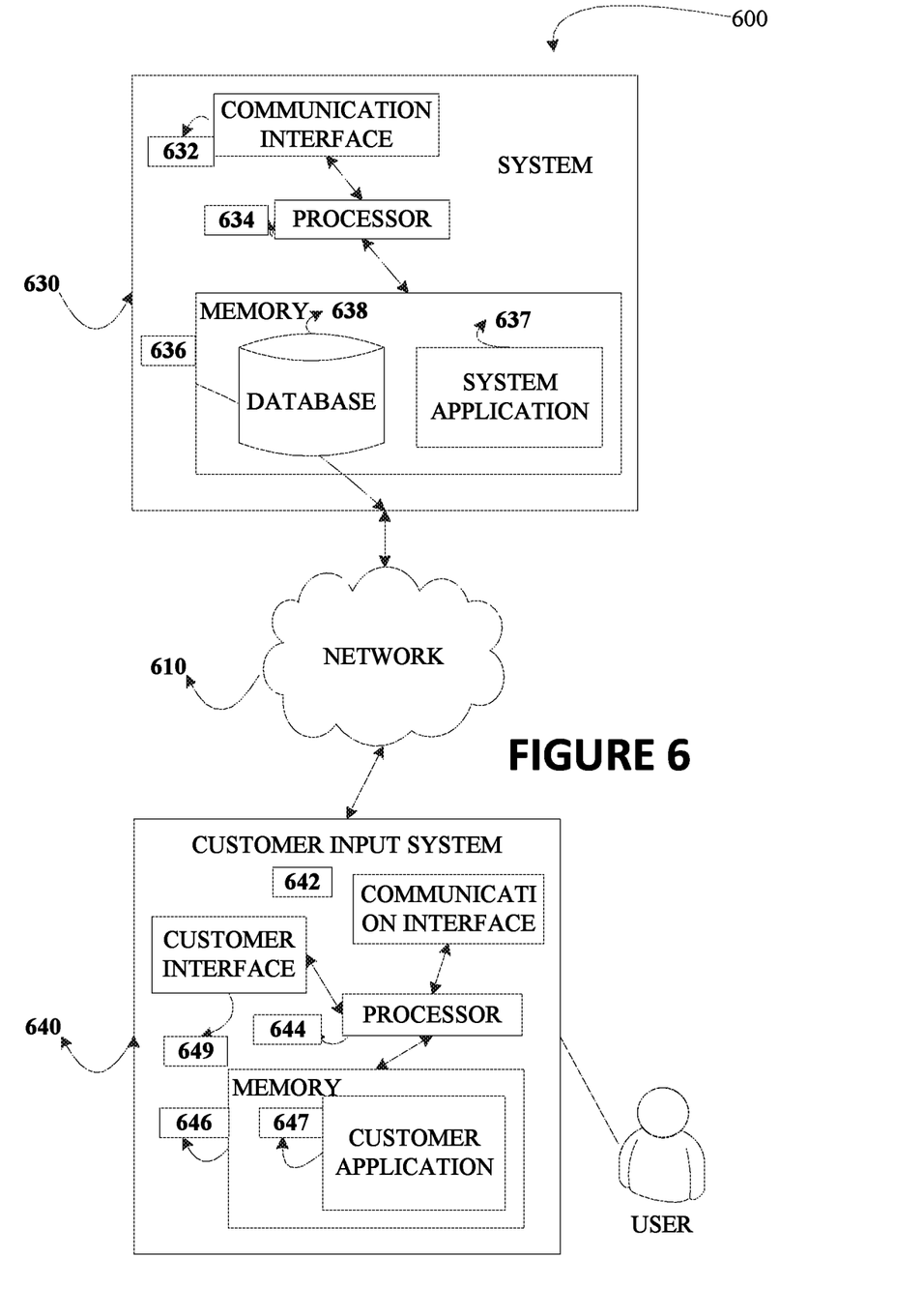
FIG. 6 presents an exemplary block diagram of the system environment in accordance with embodiments of the present invention.

FIG. 6 presents an exemplary block diagram of the system environment 600 for implementing the process flows described herein in accordance with embodiments of the present invention. As illustrated, the system environment 600 includes a network 610, a system 630, and a user input system 640. Also shown in FIG. 6 is a user of the user input system 640. The user input system 640 may be a mobile device or other non-mobile computing device. The user may be a person who uses the user input system 640 to execute a user application 647. The user application 647 may be an application to communicate with the system 630, perform a transaction, input information onto a user interface presented on the user input system 640, or the like. The user application 647 and/or the system application 637 may incorporate one or more parts of any process flow described herein.

As shown in FIG. 6, the system 630, and the user input system 640 are each operatively and selectively connected to the network 610, which may include one or more separate networks. In addition, the network 610 may include a telecommunication network, local area network (LAN), a wide area network (WAN), and/or a global area network (GAN), such as the Internet. It will also be understood that the network 610 may be secure and/or unsecure and may also include wireless and/or wired and/or optical interconnection technology.

The user input system 640 may include any computerized apparatus that can be configured to perform any one or more of the functions of the user input system 640 described and/or contemplated herein. For example, the user may use the user input system 640 to transmit and/or receive information or commands to and from the system 630. In some embodiments, for example, the user input system 640 may include a personal computer system (e.g. a non-mobile or non-portable computing system, or the like), a mobile computing device, a personal digital assistant, a mobile phone, a tablet computing device, a network device, and/or the like. As illustrated in FIG. 6, in accordance with some embodiments of the present invention, the user input system 640 includes a communication interface 642, a processor 644, a memory 646 having an user application 647 stored therein, and a user interface 649. In such embodiments, the communication interface 642 is operatively and selectively connected to the processor 644, which is operatively and selectively connected to the user interface 649 and the memory 646. In some embodiments, the user may use the user application 647 to execute processes described with respect to the process flows described herein. Specifically, the user application 647 executes the process flows described herein.

Each communication interface described herein, including the communication interface 642, generally includes hardware, and, in some instances, software, that enables the user input system 640, to transport, send, receive, and/or otherwise communicate information to and/or from the communication interface of one or more other systems on the network 610. For example, the communication interface 642 of the user input system 640 may include a wireless transceiver, modem, server, electrical connection, and/or other electronic device that operatively connects the user input system 640 to another system such as the system 630. The wireless transceiver may include a radio circuit to enable wireless transmission and reception of information. Additionally, the user input system 640 may include a positioning system. The positioning system (e.g. a global positioning system (GPS), a network address (IP address) positioning system, a positioning system based on the nearest cell tower location, or the like) may enable at least the user input system 640 or an external server or computing device in communication with the user input system 640 to determine the location (e.g. location coordinates) of the user input system 640.

Each processor described herein, including the processor 644, generally includes circuitry for implementing the audio, visual, and/or logic functions of the user input system 640. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 647 of the memory 646 of the user input system 640.

Each memory device described herein, including the memory 646 for storing the user application 647 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 6, the memory 646 includes the user application 647. In some embodiments, the user application 647 includes an interface for communicating with, navigating, controlling, configuring, and/or using the user input system 640. In some embodiments, the user application 647 includes computer-executable program code portions for instructing the processor 644 to perform one or more of the functions of the user application 647 described and/or contemplated herein. In some embodiments, the user application 647 may include and/or use one or more network and/or system communication protocols.

Also shown in FIG. 6 is the user interface 649. In some embodiments, the user interface 649 includes one or more output devices, such as a display and/or speaker, for presenting information to the user. In some embodiments, the user interface 649 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 649 includes the input and display devices of a mobile device, which are operable to receive and display information.

FIG. 6 also illustrates a system 630, in accordance with an embodiment of the present invention. The system 630 may refer to the "apparatus" described herein. The system 630 may include any computerized apparatus that can be configured to perform any one or more of the functions of the system 630 described and/or contemplated herein. In accordance with some embodiments, for example, the system 630 may include a computer network, an engine, a platform, a server, a database system, a front end system, a back end system, a personal computer system, and/or the like. Therefore, the system 630 may be a server managed by the entity. The system 630 may be located at the facility associated with the entity or remotely from the facility associated with the entity. In some embodiments, such as the one illustrated in FIG. 6, the system 630 includes a communication interface 632, a processor 634, and a memory 636, which includes a system application 637 and a structured database 638 stored therein. As shown, the communication interface 632 is operatively and selectively connected to the processor 634, which is operatively and selectively connected to the memory 636.

It will be understood that the system application 637 may be configured to implement any one or more portions of the various user interfaces and/or process flow described herein. The system application 637 may interact with the user application 647. It will also be understood that, in some embodiments, the memory includes other applications. It will also be understood that, in some embodiments, the system application 637 is configured to communicate with the structured database 638, the user input system 640, or the like.

It will be further understood that, in some embodiments, the system application 637 includes computer-executable program code portions for instructing the processor 634 to perform any one or more of the functions of the system application 637 described and/or contemplated herein. In some embodiments, the system application 637 may include and/or use one or more network and/or system communication protocols.

In addition to the system application 637, the memory 636 also includes the structured database 638. As used herein, the structured database 638 may be one or more distinct and/or remote databases. In some embodiments, the structured database 638 is not located within the system and is instead located remotely from the system. In some embodiments, the structured database 638 stores information or data described herein.

It will be understood that the structured database 638 may include any one or more storage devices, including, but not limited to, datastores, databases, and/or any of the other storage devices typically associated with a computer system. It will also be understood that the structured database 638 may store information in any known way, such as, for example, by using one or more computer codes and/or languages, alphanumeric character strings, data sets, figures, tables, charts, links, documents, and/or the like. Further, in some embodiments, the structured database 638 may include information associated with one or more applications, such as, for example, the system application 637. It will also be understood that, in some embodiments, the structured database 638 provides a substantially real-time representation of the information stored therein, so that, for example, when the processor 634 accesses the structured database 638, the information stored therein is current or substantially current.

FIG. 6 illustrates an exemplary process flow for a system for reviewing customer information, 600. As shown in block 602, the system may be configured to receive information from a customer. In one aspect, the information received from the customer may be based on the financial institution service provided to the customer. In response, the system may be configured to generate one or more documents, as shown in block set 604. In one aspect, a portion of the one or more documents generated may have customer information. As shown in the Figure, document 1, document 3, and document 6 have customer information. In response, the one or more generated documents may be stored in a financial institution database, as shown in block 606. In some embodiments, the system may be configured to retrieve one or more documents having customer information from the financial institution database, as shown in block set 608. The system may then extract customer information from the retrieved one or more documents and compare 612 the extracted customer information 610 with the received customer information, as shown in block 614 to determine a match. If the customer information extracted from the retrieved one or more documents and the received customer information match, the system may validate the information, as shown in block 616. If the customer information extracted from the retrieved one or more documents and the received customer information do not match, the system may then edit the information to ensure that they match and store the one or more edited documents in the financial institution database, as shown in block 618.

It will be understood that the embodiment of the system environment illustrated in FIG. 6 is exemplary and that other embodiments may vary. As another example, in some embodiments, the system 630 includes more, less, or different components. As another example, in some embodiments, some or all of the portions of the system environment 600 may be combined into a single portion. Likewise, in some embodiments, some or all of the portions of the system 630 may be separated into two or more distinct portions.

In addition, the various portions of the system environment 600 may be maintained for and/or by the same or separate parties. It will also be understood that the system 630 may include and/or implement any embodiment of the present invention described and/or contemplated herein. For example, in some embodiments, the system 630 is configured to implement any one or more of the embodiments of the process flows described and/or contemplated herein in connection any process flow described herein. Additionally, the system 630 or the user input system 640 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for generating a one-time bank card number for automated teller machine (ATM) usage, the method comprising:
   presenting, using a display of a mobile device, a digital wallet, wherein the digital wallet is configured to represent storage of a plurality of one-time bank card numbers and/or readable indicia in a memory of the mobile device, the digital wallet comprising:
      a transfer input configured to receive input from the user and initiate a transfer of funds to a third party;
      a purchase input configured to receive input from the user and initiate a purchase with a merchant;
      a withdraw input configured to receive input from the user and initiate an ATM transaction on an account owned by the user; and
      a generate input configured to receive input from the user and initiate generation of a readable indicia;
   receiving, by a computing device processor of the mobile device using the withdraw input of the digital wallet, a request from a user to perform the ATM transaction on the account owned by the user;
   in response to the request to perform the ATM transaction, generating, by the computing device processor of the mobile device, a one-time bank card number associated with the account owned by the user; generate the readable indicia based at least in part on the one-time bank card number; and
   initiating, by the computing device processor, communication of the readable indicia to an ATM by causing the display of the mobile device to display the readable indicia, whereby based on validation of a user authentication credential received from the user, a bank system facilitates the ATM transaction for the user's account.

2. The method of claim 1, wherein the method further comprises:
   receiving a card limit from the user, wherein the card limit indicates a threshold transaction amount limiting usage of a bank card for use in an ATM transaction; and
   wherein generating the one-time bank card number is based at least in part on the received card limit; and
   wherein the readable indicia indicates the card limit to an ATM receiving the readable indicia.

3. The method of claim 2, wherein the readable indicia indirectly indicates to the ATM the card limit by providing a pointer that points to a data location at which the ATM may retrieve the card limit.

4. The mobile device of claim 2, wherein the one-time bank card number directly indicates to the ATM the card limit, and whereby the ATM is configured to receive the communication initiated by the mobile device and determine the card limit based on the one-time bank card number.

5. The method of claim 1 further comprises generating, using a card generation algorithm, the one-time bank card number; and determining, using a card interpretation algorithm, whether a one-time bank card number is valid.

6. The method of claim 5, wherein the card interpretation algorithm is further configured to determine a card limit associated with a one-time bank card number.

7. The method of claim 1, wherein initiating communication comprises:
   initiating communication with the ATM conducting the transaction with the user; and
   receiving, from the ATM, confirmation of approval of the transaction.

8. The method of claim 1 further comprising:
   initiating communication of a stored authentication credential from the mobile device to the ATM, whereby the ATM can compare the stored authentication credential with the user authentication credential, and in response to determining a match, approve the ATM transaction for the user's account.

9. The method of claim 8, wherein the stored authentication credential is communicated from the mobile device to the ATM by the readable indicia.

10. The method of claim 1 further comprising initiating communication of instructions for the ATM to retrieve a stored authentication credential from a financial institution system.

11. A computer program product for generating a one-time bank card number for ATM usage, the computer program product comprising a non-transitory computer-readable medium comprising code causing a mobile device to:
  present, using a display of the mobile device, a digital wallet, wherein the digital wallet is configured to store a plurality of one-time bank card numbers and/or readable indicia, the digital wallet comprising:
    a transfer input configured to receive input from the user and initiate a transfer of funds to a third party;
    a purchase input configured to receive input from the user and initiate a purchase with a merchant;
    a withdraw input configured to receive input from the user and initiate an ATM transaction on an account owned by the user; and
    a generate input configured to receive input from the user and initiate generation of a readable indicia;
  receive a request from a user to perform the ATM transaction on the account owned by the user;
  in response to the request to perform the ATM transaction, generate a one-time bank card number associated with the account owned by the user;
  generate the readable indicia based at least in part on the one-time bank card number; and
  initiate communication of the readable indicia to an ATM by causing the display to display the readable indicia, whereby based on validation of a user authentication credential received from the user, a bank system facilitates the ATM transaction for the user's account.

12. The computer program product of claim 11, wherein the computer code is further configured to cause the mobile device to:
  receive a card limit from the user, wherein the card limit indicates a threshold transaction amount limiting usage of a bank card for use in an ATM transaction; and
  wherein generating the one-time bank card number is based at least in part on the received card limit; and
  wherein the readable indicia indicates the card limit to an ATM receiving the readable indicia.

13. The computer program product of claim 12, wherein the readable indicia indirectly indicates to the ATM the card limit by providing a pointer that points to a data location at which the ATM may retrieve the card limit.

14. The computer program product of claim 12, wherein the one-time bank card number directly indicates to the ATM the card limit, and whereby the ATM is configured to receive the communication initiated by the mobile device and determine the card limit based on the one-time bank card number.

15. The computer program product of claim 11, wherein the computer code is further configured to cause the mobile device to: generate, using a card generation algorithm, the one-time bank card number; and determine, using a card interpretation algorithm, whether a one-time bank card number is valid.

16. The computer program product of claim 15, wherein the card interpretation algorithm is further configured to determine a card limit associated with a one-time bank card number.

17. The computer program product of claim 11, wherein initiating communication comprises:
  initiating communication with the ATM conducting the transaction with the user; and
  receiving, from the ATM, confirmation of approval of the transaction.

18. The computer program product of claim 11, wherein the computer code is further configured to cause the mobile device to:
  initiate communication of a stored authentication credential from the mobile device to the ATM, whereby the ATM can compare the stored authentication credential with the user authentication credential, and in response to determining a match, approve the ATM transaction for the user's account.

19. The computer program product of claim 18, wherein the stored authentication credential is communicated from the mobile device to the ATM by the readable indicia.

20. The computer program product of claim 11, wherein the computer code is further configured to cause the mobile device to:
  initiate communication of instructions for the ATM to retrieve a stored authentication credential from a financial institution system.

* * * * *